April 4, 1967  C. B. DENNY  3,311,997
NUMERALS BALANCE SCALE
Filed Jan. 5, 1965  2 Sheets-Sheet 1
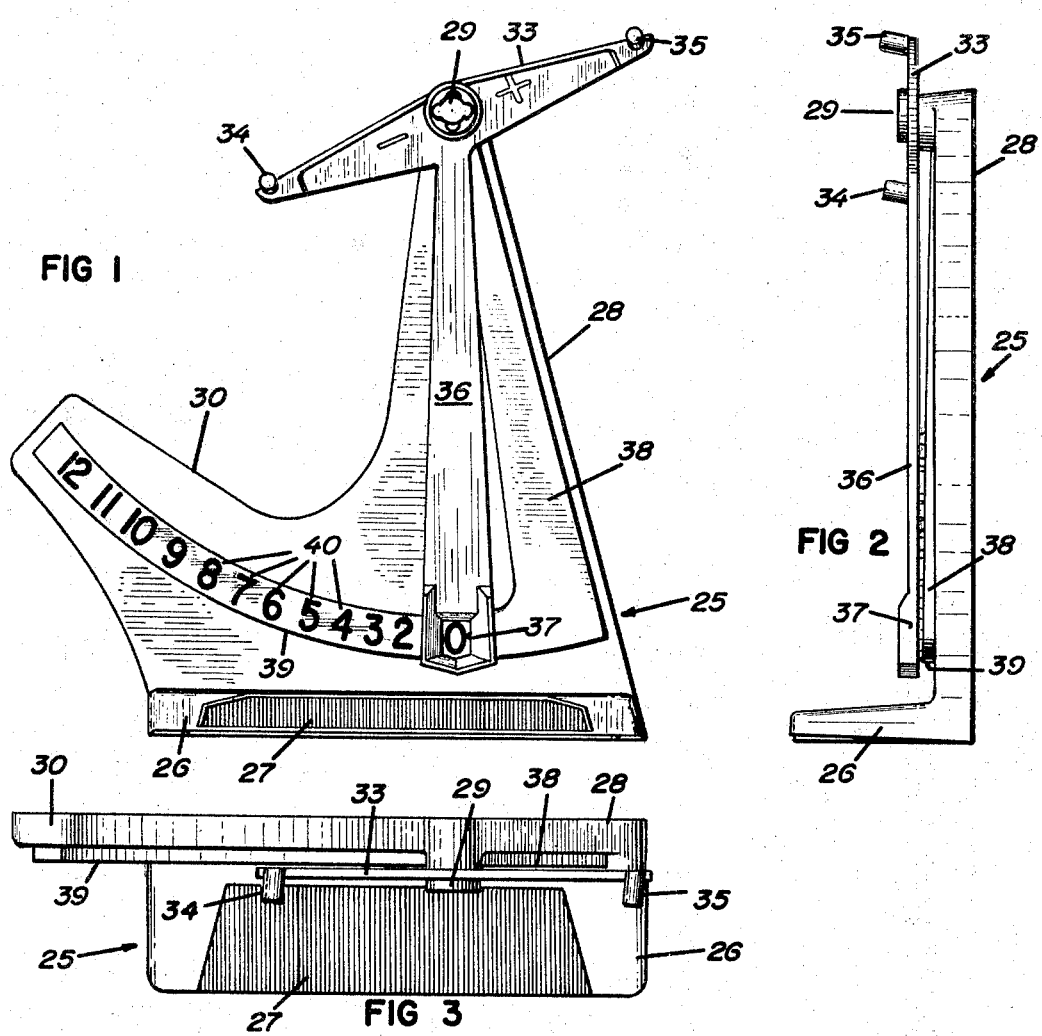
INVENTOR.
Carl B. Denny
BY
Raymond N. Matson
HIS PATENT AGENT April 4, 1967     C. B. DENNY     3,311,997
NUMERALS BALANCE SCALE
Filed Jan. 5, 1965     2 Sheets-Sheet 2
FIG 4    FIG 5    FIG 6    FIG 7    FIG 8    FIG 9
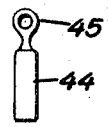   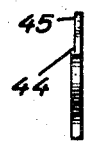 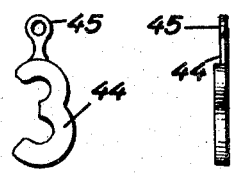
FIG 10    FIG 11    FIG 12    FIG 13    FIG 14    FIG 15
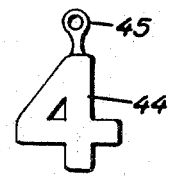  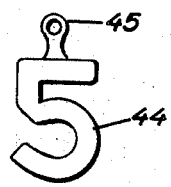 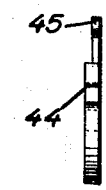 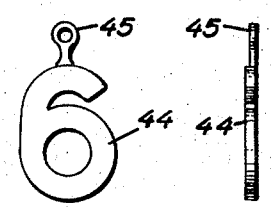
FIG 16    FIG 17    FIG 18    FIG 19    FIG 20    FIG 21
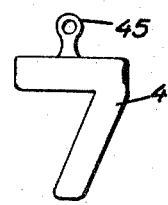  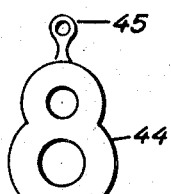  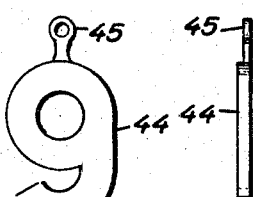
INVENTOR.
Carl B. Denny
BY
Raymond N. Matson
HIS PATENT AGENT United States Patent Office 3,311,997
Patented Apr. 4, 1967

3,311,997
NUMERALS BALANCE SCALE
Carl B. Denny, Vanleer, Tenn., assignor to Kusan, Inc., Nashville, Tenn., a corporation of Kentucky
Filed Jan. 5, 1965, Ser. No. 423,473
10 Claims. (Cl. 35—31)

This invention relates generally to educational toys and more particularly to an attractive balance scale upon which children may place numerals which are keyed to their weights so as to instruct them in arithmetic including both addition and substraction, during their play.

While educational devices of this general type are known in the art, they have been found to be undesirable in use because of failure to attain their play and educational objectives for a number of reasons. Among these are: a limitation of the device to the mere balancing of one or more weighted numbers, etc. against one or more others with the unlikelihood of the plural numbers being used or equated being remembered by a child; an inability of the balance device even where a pointer is used, to indicate more than that one weighted number or group of numbers is equal to or not equal to the weight of one or more other numbers; an inability to rapidly interchange weighted numbers or groups of numbers so that a child soon loses interest in playing with the device; the use of a complex device required adjustments beyond the mechanical ability of a child; and the use of poorly designed devices of inadequate strength resulting in early breakage thereof or of the associated parts.

Accordingly, the main object of the present invention is to provide an attractive toy in the form of an improved balance scale and weighted numerals to resemble figures therefor which will instruct children in numbers and their values while being entertaining for play.

An important object of the present invention is to provide an improved, attractive, precision toy balance having an indicating scale wherein weighted numbers may be placed in various combinations and positions on a balance arm so as to arithmetically add or substract their respective weights, which addition or subtraction is directly indicated on the scale.

A further important object of the present invention is to provide an improved directly reading, toy balance scale with associated numbered weights by which addition and subtraction is incidentally taught to children during their play therewith, which is simple but strong and rugged in construction, will be of long life in use, and which is susceptible of ready and economic manufacture.

In the drawings I have shown one embodiment of the invention: In this showing:

FIGURE 1 is a front elevational view of the numerals balance scale comprising the present invention;

FIGURE 2 is a side elevational view thereof;

FIGURE 3 is a top plan view thereof;

FIGURES 4 to 21 inclusive are front and side elevational views respectively, showing the numerals 1 to 9 used in connection with the balance scale and their respectively increased sizes and thicknesses;

FIGURE 22 is a diagrammatic front elevational view of the invention illustrating the addition of two numbers or numerals and the scale indication of the resulting total; and FIGURE 23 is a similar view illustrating the subtraction of two numbers or numerals and the scale indication of the resulting difference.

Referring to the drawings, numeral 25 designates the invention as a whole which comprises an L-shaped upstanding frame having a substantial base 26 including a decorative and strengthening ribbed area 27, an upstanding bracket portion 28 terminating in a fulcrum which may take any desired form such as a pin, notch, etc. and is shown as a pin 29, and a lower, laterally projecting, arcuate scale-bearing portion 30.

A balance arm 33 is mounted intermediate its ends for free pivotal movement on the fulcrum or pin 29 and includes numeral supporting means in any suitable form such as an eye, recess, pin, etc. and is illustrated as upwardly inclined, numeral-receiving pins 34, 35 arranged adjacent its ends, and a downwardly depending, pendulum type arm 36 having merely an indicating pointer or as shown, a window aperture or opening 37 formed therein for registry with the numerals of a scale as will be described. The balance arm is so formed that the moment of either end about the fulcrum is equal to the moment of the other end.

The front surface of the L-shaped frame is provided with a downwardly extending decorative raised portion 38 which is then extended arcuately to the left as at 39 (FIGURE 1) about the fulcrum or pin 29 as a center, to form a scale 40 of the spaced numbers zero to twelve. It will be apparent that the pointer or the window 37 of the arm 36 will move along the scale 40 to indicate or uncover successive scale numbers as the arm is pivoted on the fulcrum or pin 29 in response to the placing of weighted numerals 44 on either or both of the numeral-receiving means or pins 34, 35.

The numerals 44 are disclosed in FIGURES 4 to 21 and their sizes and thicknesses increase directly as they vary in figure shapes from one to nine. Thus, if the numeral shaped as a figure 1 weighs, for example, 0.6 gram, the numeral shaped as a figure two will weigh 1.2 grams, numeral 3 will weigh 1.8 grams, etc. Each of the numerals 44 is provided with a hook or an apertured hanger 45 as shown by which it may be readily suspended on or removed from the balance arm numeral supporting means 34, 35 during the course of play or performance of additions and subtractions by a child, etc.

While the numerals balance scale may readily be formed of any desired materials, it is preferably formed of a strong plastic such as high impact styrene which is available in different bright colors so as to be attractive to a child. Thus the L-shaped frame could be integrally molded in one color, the balance arm 33 and its indicating pendulum arm could be integrally molded in a second color, and the letters 44 could be molded in nine different other colors or shades.

The use of the invention in the performance of arithmetical additions and subtractions by children or adults is believed to be readily apparent.

In the case of addition as is illustrated in FIGURE 22, any selected numeral or numerals 44 will be placed on the right hand or plus sign side of the balance arm 33 instead of on the left side which (FIGURE 1) bears a minus sign, the two signs functioning to guide a child in the exercise attempted. It will be appreciated that if a numeral figure 1 is placed on the balance arm supporting means or pin 35, the pendulum arm 36 and its pointer or window 37 will move over and point to or uncover or frame respectively the scale 40 numeral 1 due to the weight imbalance. Thus, as shown in FIGURE 22, the placing of numeral 44 figures 1 and 2 on the plus balance arm supporting means or pin 35, moves the pendulum arm and its pointer or window 37 to uncover the scale 40 numeral 3 which is their sum.

The performance of subtractions is as simply accomplished and is illustrated in FIGURE 23 wherein a numeral 44 in the shape of a figure five is placed on the plus balance arm supporting means or pin 35 and a figure 3 is placed on the minus balance arm supporting means or pin 34. The numerals 44 being weighted directly in accordance with the shape or indicated number of their figure, the imbalance of the weights is that of the weight of the numeral 2 so as to move the pendulum pointer or window over the arcuate scale 40 numeral 2 as shown.

Obviously, the equating or balancing of numerals or groups of numerals 44 can be as readily performed with such equating being indicated as accomplished by the pendulum or pointer arm window 37 coming to rest over the scale 40 numeral 0. It will also be appreciated that there is a predetermined relationship between the spacing of the numbers forming the scale 40, the spacing of the numeral-supporting means or pins 34, 35 from the fulcrum or pin 29, and the size and length of the pendulum pointer 36 to effect the described precise addition, subtraction, and equating capabilities of the invention. Also, the scale may be arranged above the fulcrum in which case the pendulum is extended above the fulcrum so as to function as a pointer, while the lower pendulum portion or a weight substituted therefor, acts as a counterbalance for the balancing arm as before.

It will be apparent that in the absence of the pendulum, only equating (balancing) functions may be performed as the addition of a weighted numeral to either end of the balance arm would merely move it to a lowermost position with the other end directly above it. Thus, the relative positions of the correlated balance arm, pendulum and arcuate scale all cooperate to effect the precise, directly reading numerals balance scale comprising with the weighted numerals, the educational toy of the invention.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. The combination with an upstanding supporting frame having a fulcrum and a sum and difference indicating number scale arranged thereon, a balance arm pivotally mounted on the fulcrum and having an indicating arm fixed thereto and movable along the number scale, and numeral receiving means adjacent opposite ends of the balance arm for receiving weighted numerals to be added and subtracted; of a plurality of weighted numerals selectively positionable on said numeral-receiving means to effect movement of said balance arm about said fulcrum and said indicating arm along said number scale to a number indicating the sum and difference of said weighted numbers.

2. The combination recited in claim 1 wherein said scale is arcuate and arranged with said fulcrum as its arcuate center.

3. The combination recited in claim 1 wherein the relative positions of said balance arm, indicating arm, and said scale numbers are such as to indicate a zero sum and difference when no weighted numerals are positioned on said numeral-receiving means.

4. The combination recited in claim 1 wherein the relative positions of said balance arms, indicating arm, and said scale numbers are such as to indicate a zero sum and difference when equal weights of numerals are positioned on each of said numeral-receiving means.

5. A balance scale for adding and subtracting numerals weighted directly in accordance with their numeral figure and for directly indicating their sum and difference comprising a base, an upstanding bracket mounted on said base and having a fulcrum, a balance arm pivotally mounted on said fulcrum and having a sum and difference number indicating arm, the opposite ends of said balance arm having a weighted number-receiving means with one arm end bearing a plus indication and the other a minus indication, and a sum and difference indicating number scale arranged adjacent to and on the minus side of said indicating arm to indicate the weight or sum of the weighted numerals when at least one weighted numeral is placed on said plus arm weighted numeral-receiving means to effect movement of said indicating arm along said number scale.

6. A balance scale for adding and subtracting numerals weighted directly in accordance with their numeral figure and for directly indicating their sum and difference comprising a base, an upstanding bracket mounted on said base and having a fulcrum, a balance arm pivotally mounted on said fulcrum and having a sum and difference number indicating arm, the opposite ends of said balance arm having a weighted number-receiving means with one arm end bearing a plus indication and the other a minus indication, and a sum and difference indicating number scale arranged adjacent to and on the minus side of said indicating arm to indicate the numerical and weight difference when a weighted numeral is placed on said plus arm means and a lighter weighted numeral is placed on said minus arm means to effect movement of said indicating arm along said number scale.

7. A balance scale for adding and subtracting numerals weighted directly in accordance with their numeral figure and for directly indicating their sum and difference comprising a base, an upstanding bracket mounted on said base and having a fulcrum, a balance arm pivotally mounted on said fulcrum and having a sum and difference number indicating arm, the opposite ends of said balance arm having a weighted number receiving means with one arm end bearing a plus indication and the other a minus indication, and a sum and difference indicating number scale arranged adjacent to and on the minus side of said indicating arm to indicate a zero sum and difference of the weighted numerals when equally weighted numerals are placed on said weighted numeral-receiving means of said plus and said minus balance arm ends.

8. The combination recited in claim 5 wherein said scale bears numbers, and the weight is in the shape of a figure keyed to its numerical value times a unit weight and to the sum and difference indicated by the number on said scale.

9. A balance scale for adding and subtracting numerals weighted directly in accordance with their numeral figure and directly indicating the sum and difference comprising, in combination, a supporting frame; a fulcrum mounted on said supporting frame; a balance arm pivoted on said fulcrum and having numeral-receiving means adjacent its ends for receiving weighted numerals to be added and subtracted; a sum and difference indicating number scale; and an indicating arm fixed to said balance arm and movable in front of said scale; said arm having an opening in registry with said scale to display the scale number indicating the sum and difference respectively of the weighted numerals.

10. The combination recited in claim 9 wherein said scale is arcuate and arranged with said fulcrum as its arcuate center.

References Cited by the Examiner

UNITED STATES PATENTS

| 1,950,072 | 3/1934 | Townsend | 35—31 |
| 3,000,114 | 9/1961 | Orlov | 35—30 |

FOREIGN PATENTS

| 611,831 | 4/1935 | Germany. |
| 650,205 | 2/1951 | Great Britain. |

OTHER REFERENCES

General Merchandise Company Catalog; Fall 1960 through Summer 1961 Edition. Page 619 pertinent.

EUGENE R. CAPOZIO, *Primary Examiner.*

W. GRIEB, *Assistant Examiner.*